(12) United States Patent
Murphy

(10) Patent No.: US 7,270,299 B1
(45) Date of Patent: Sep. 18, 2007

(54) SPACE BASED CHANGE DETECTION USING COMMON GROUND TRACK CONSTELLATIONS

(75) Inventor: John H. Murphy, Ellicott City, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 196 days.

(21) Appl. No.: 11/086,747

(22) Filed: Mar. 23, 2005

Related U.S. Application Data

(60) Provisional application No. 60/555,298, filed on Mar. 23, 2004, provisional application No. 60/555,297, filed on Mar. 23, 2004.

(51) Int. Cl.
*B64G 1/10* (2006.01)
(52) U.S. Cl. .................................. 244/158.4
(58) Field of Classification Search ............. 244/158.4; 455/12.1, 13.1, 427; 250/334, 201.5; 342/352
See application file for complete search history.

(56) References Cited

U.S. PATENT DOCUMENTS

| | | | | |
|---|---|---|---|---|
| 3,243,706 | A * | 3/1966 | Grisham ................... | 244/158.4 |
| 3,497,807 | A * | 2/1970 | Newton ...................... | 455/13.1 |
| 5,379,065 | A * | 1/1995 | Cutts .......................... | 348/269 |
| 5,420,789 | A * | 5/1995 | Fulton ........................ | 250/334 |
| 5,551,624 | A * | 9/1996 | Horstein et al. ........... | 455/12.1 |
| 5,906,337 | A | 5/1999 | Williams et al. | |
| 5,971,324 | A | 10/1999 | Williams et al. | |
| 6,102,335 | A * | 8/2000 | Castiel et al. ............. | 244/158.4 |
| 6,198,907 | B1 | 3/2001 | Torkington et al. | |
| 6,317,583 | B1 * | 11/2001 | Wolcott et al. ............ | 455/12.1 |
| 6,479,808 | B1 * | 11/2002 | Schwemmer ............ | 250/201.5 |
| 6,502,790 | B1 | 1/2003 | Murphy | |
| 6,695,260 | B2 * | 2/2004 | Castiel et al. ............. | 244/158.4 |
| 2002/0160710 | A1* | 10/2002 | Castiel et al. ............... | 455/12.1 |

* cited by examiner

*Primary Examiner*—Rob Swiatek
(74) *Attorney, Agent, or Firm*—Birch, Stewart, Kolasch & Birch, LLP

(57) ABSTRACT

A new approach for designing satellite constellations whereby each satellite follows a common ground track is being proposed for performing high-precision change detection imagery for long periods of time. By precisely prescribing the orbital parameters, i.e., the relationship between the right ascension of the ascending nodes (RAAN) and the phase angle difference between successive satellites, for example, sharpened change detection images may be taken from successive satellites in the constellation without the need to process out blurring by any special image reworking software. The relationship between the orbital parameters of the satellites is precisely tuned to the earth's rotation rate for the altitude of the satellites. A reduction in the total satellite count is achievable due to tiling the satellite coverage in near optimal arrangements. Such high-precision change detection imaging by successive satellites in orbit around the earth is at least useful in the detection of underground facilities activities and the detection of slow moving objects.

21 Claims, 14 Drawing Sheets

SPACE BASED CHANGE DETECTION USING COMMON GROUND TRACK CONSTELLATIONS

CROSS REFERENCE TO RELATED APPLICATION

The present application claims the benefit of U.S. Provisional Patent Application No(s). 60/555,298 and 60/555,297, both filed on Mar. 23, 2004, the entire contents of both which are hereby incorporated by reference.

BACKGROUND OF THE INVENTION

1. Field of the Invention

This invention relates generally to satellite constellations and more particularly to satellite constellations orbiting on common ground tracks for providing enhanced space based change detection.

2. Description of Related Art

A typical method for detecting moving targets, that has been used by intelligence personnel for more than 50 years, is to search for changes in these common images. Change detection, as this process might be referred, allows one to analyze moving targets by examining successive images such synthetic-aperture radar (SAR) or optical images. Also, areas where tunnels or underground bunkers are under construction have been generally located by comparing temporally displaced images.

Ideally, when change detection is performed one wants to take the images from a fixed platform. However, in practice one takes the images from mobile platforms such as planes or satellites. However, the motion and displacement of the platforms when the images are taken may distort and blur the change detection images. Existing imaging systems try to minimize these effects by tasking the sensor systems aboard the mobile platforms at near optimum collection times.

The problem is that most satellite systems that are used for reconnaissance have not been designed with the object of performing change detection with minimal blurring and distortion. For example, as shown in FIG. 1, existing satellite systems are generally organized into orbital planes, wherein a plane is uniquely defined by (1) an inclination angle, i, relative to the Earth's equator and (2) an angle of the Right Ascension of the Ascending Node, RAAN. Orbital parameters such as these are used to describe a satellite's orbit and a constellation's configuration. For instance, the inclination, i, is a constant defining the angle at which the orbital plane intersects the equator. Likewise, the RAAN defines an angle between a non-rotating celestial reference, i.e., the first point of Aries, and the line of nodes. The line of nodes is defined by a line formed using the intersection of an orbital plane and the plane of the equator. The line of nodes provides an orbit orientation. As such, all satellites with common values for i and RAAN are said to be in the same orbital plane.

However, a typical problem with satellites organized into orbital planes, either the same orbital plane or different orbital planes, is that the ground tracks/paths, i.e., the movement of beams across the surface of the earth, are typically not common. In other words, different ground tracks are typically drawn out with successive satellites.

Most existing satellite constellations are based on a type of configuration known as the Walker orbit configuration, which is illustrated in FIG. 2. This Walker type orbit configuration is based on a globally symmetrical collection of satellites. Typically, the satellites in a Walker orbit are organized into planes having common values for inclination and right ascension of the ascending node. This type of configuration is motivated in part by the larger costs associated with placing satellites into different orbital planes. For instance, it is cheaper to have multiple satellites placed into a single plane from a single launch vehicle. As such, Walker configurations consist of multiple satellites in a single plane.

However, such Walker configurations are sub-optimal configurations because they fail to provide minimal satellite counts and high revisit rates to particular regions on the earth. Furthermore, Walker obits are restricted to having a phasing parameter, F, that must be an integer in the range of 0 and P−1, where P represents the number of planes being used.

In addition, as shown in FIG. 2, Walker configurations consist of a plurality of equally spaced satellites having circular orbits with particular orbital inclinations. Such Walker configurations are defined by a three integer code T/P/F, where T represents the total number of satellites in the pattern, P represents the number of planes between which the number of satellites are equally divided, and F is a measure of the relative phasing of satellites in the adjacent planes. The inclination angle, i, of all the orbital planes is relative to a reference plane that is typically the equator of the earth.

In FIG. 2, a Walker configuration of satellites consists of a plurality of inclined planes, i.e., non-polar satellite orbital planes, i.e., planes 1 and 2, which cross the equator at an angle i, an inclination angle that is common to all planes in the constellation. In a Walker configuration, all of the orbital planes have an equal planar spacing, i.e., 360°/P, where again P is equal to the number of orbital planes. Further, all of the satellites are equally spaced along the respective orbital plane, e.g. orbital plane 1, by 360°P/T, where again T is the total number of satellites. The phasing difference between satellites in adjacent planes 1 and 2, which is referenced against the equator, is 360°F/T, where again F is the phasing parameter which here consists of an integer. As a result, for Walker orbits, the ground tracks/paths of the collection of satellites are seldom common.

These distinctive (uncommon) ground tracks/paths of the Walker configuration are illustrated in FIG. 3. In FIG. 3, the orbits for a 2/1/0 Walker orbit is illustrated. The 2/1/0 represents two satellites in one orbital plane and no phasing angle due to the fact that only one plane is being used. The orbital altitude selected in the FIG. 3 example is set to 10,349.56 km because at this altitude the ground tracks of any satellite retraces itself only once every 24 hours. In other words, in this example, the same path, i.e., a common ground track, is taken at most only once in a 24-hour period.

Furthermore, observe that there are six distinctive ground traces in FIG. 3: there are three ground traces for satellite 1 and three other ground traces for satellite 2. The selection of the altitude of 10,349 Km causes the satellite ground traces to close upon themselves after three traces around the earth. In other words, the satellites in FIG. 3 each orbits the earth three times, cutting out a distinctive ground track each time, before they can begin to retrace a previous ground track. Ground traces close upon themselves when the ground tracks begin to repeat/retrace. However, the closure of the ground traces upon themselves in a finite number of orbits is not necessarily a requirement for constellation design.

As noted above, in FIG. 3, after three ground traces the ground tracks close on themselves and correspond to the ground track for satellite 1. Likewise, another three ground traces close on themselves and correspond to the ground track for satellite 2. Although these two satellites, satellite 1 and satellite 2, are in a common orbital plane and form a symmetrical constellation, which is typical of Walker orbit constellations, satellite 1 and satellite 2 fail to have common ground tracks. Instead, at the 10,349.56 km altitude, each satellite has 3 distinctive ground traces covering 2π radians (360°) of longitude.

Imagine if detection images were to be taken from both satellite 1 and satellite 2. When these images are actually taken of a common region of the earth, blurring and distortion of the images will occur because the two satellites follow different ground tracks/paths. A technique which has been used to remove these defects from the images is called morphing. For example, morphing is used to stretch and twist the images to compensate for the blurring and distortion.

However, even when this morphing technique is performed, errors still remain in the images due to the fact that the images are of three-dimensional regions, instead of two-dimensional regions. In other words, the stretching and twisting of the images by using the morphing technique may compensate for the blurring and distortion of two-dimensional images but does not adequately compensate for three-dimensional images which are typically taken by satellites.

What is needed is a common ground track satellite constellation that provides sharpened change detection images with minimal blurring and distortion.

SUMMARY OF THE INVENTION

An aspect of the present invention to provide a method for determining the orbital parameters for groups of satellites in common ground track orbits.

It is a further aspect of the present invention to provide sharpened change detection images having minimal image blurring and distortion from a space based apparatus.

Still another aspect of the present invention is to provide constellation of satellites organized along common ground tracks with reduced numbers due to tiling of the satellites.

Further, an aspect of the present invention is to define a constellation that is composed of common ground tracks for multiple satellite traversals.

These and other aspects of the present invention are at least achieved by a group of asymmetrical satellites designed to provide either continuous world-wide or regional coverage for applications including, but not limited to, high-precision change detection imaging by successive satellites in orbit around the Earth, in the detection of underground facilities activities and slow moving objects, for example.

Further scope of applicability of the present invention will become apparent from the detailed description provided hereinafter. It should be understood, however, that the detailed description and specific embodiments, while disclosing the preferred embodiments of the invention, are being provided by way of illustration only, since various changes and modifications coming within the spirit and scope of the invention will become apparent to those skilled in the art from the following detailed description.

BRIEF DESCRIPTION OF THE DRAWINGS

The present invention will become more fully understood when the accompanying drawings are considered together with the detailed description provided hereinafter and which are provided by way of illustration only, and thus are not meant to be limitative of the invention, and wherein.

DETAILED DESCRIPTION OF PREFERRED EMBODIMENTS

Figure 1:
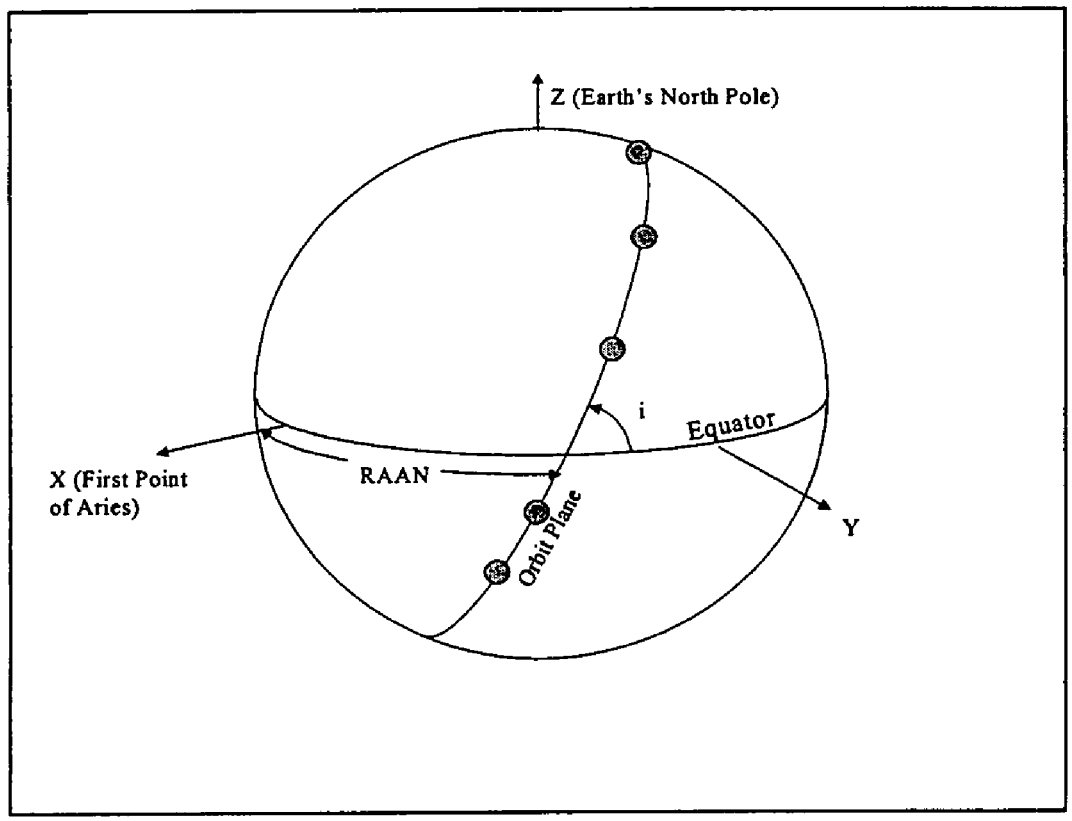
FIG. 1 is illustrative of a conventional orbital plane.
Figure 2:
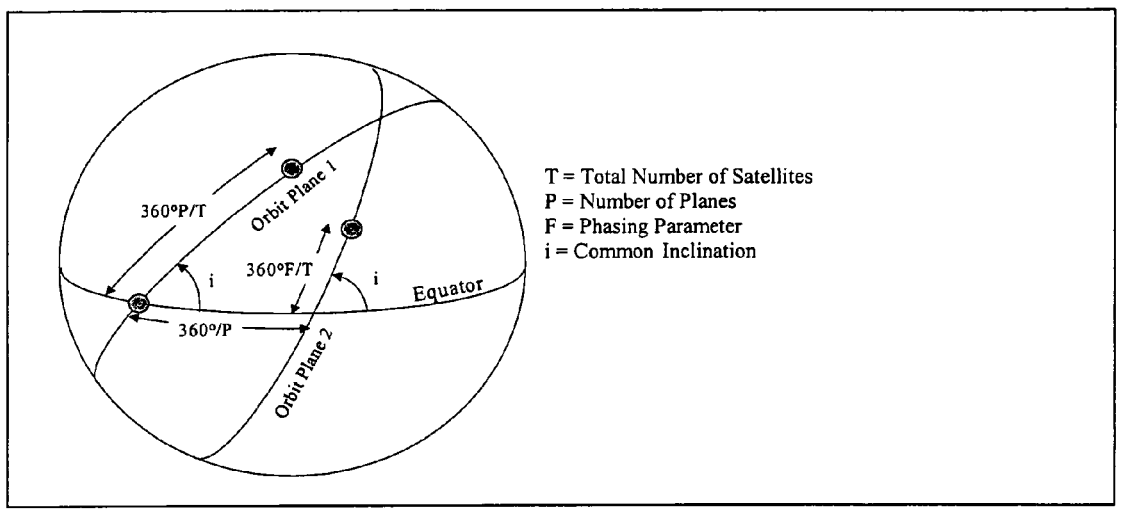
FIG. 2 is illustrative of a conventional Walker constellation.

For a general understanding of the features of the present invention, reference is made to the drawings, wherein like reference numerals/characters are used throughout to identify identical or similar elements. While the present invention will be described in terms of an illustrative embodiment or embodiments, it will be understood that the invention is adaptable to a variety of constellation design techniques, such that the present invention is not necessarily limited to the particular embodiment or embodiments shown and described herein. To the contrary, the following description is intended to cover all alternatives, modifications, and equivalents, as may be included within the spirit and scope of the invention.

A new procedure for designing satellite constellations capable of performing spaced-based global change detection are presented herein which are based on common ground tracks/paths. These new satellite constellation designs can do away with morphing techniques by providing enhanced images that are literally taken along the same path each time. Such satellite constellations can include a total satellite count that is as good as, and more often are fewer than, prior art constellations.

Such new satellite constellation designs are organized along common ground tracks so as to be able to perform high-precision change detection imagery for longer periods of time. Such high-precision change detection imaging by successive satellites in orbit around the earth is particularly useful in the detection of underground facilities activities and the detection of moving objects. The high-precision imagery can be captured via the satellites by using any number of change detection means typically used in satellite technology. Such change detection means may include SAR, optical, UV, infrared or other imaging systems or combinations thereof.

The satellite constellations as provided herein can be launched into orbit by any of numerous launch vehicles capable of doing the same. The satellites in the constellation may be launched from different launch vehicles or the satellites may all be launched from the same launch vehicle or any combination thereof. Whichever way they reach orbit, once in orbit, such satellite constellations are provided with station keeping arrangements to ensure that they follow the desired ground tracks/paths. Station keeping is required in order to minimize the amount of drifting typically encountered by satellites due in part to the elliptical shape of the earth. This drifting of the satellites is generally a non-linear effect. Station keeping of the herein described new constellation designs helps to ensure the common ground tracks/paths.

As illustrated below, the new satellite constellation designs are also capable of having reduced satellite counts due to the technique of tiling the satellites coverage in a near optimal arrangement.

Figure 4:
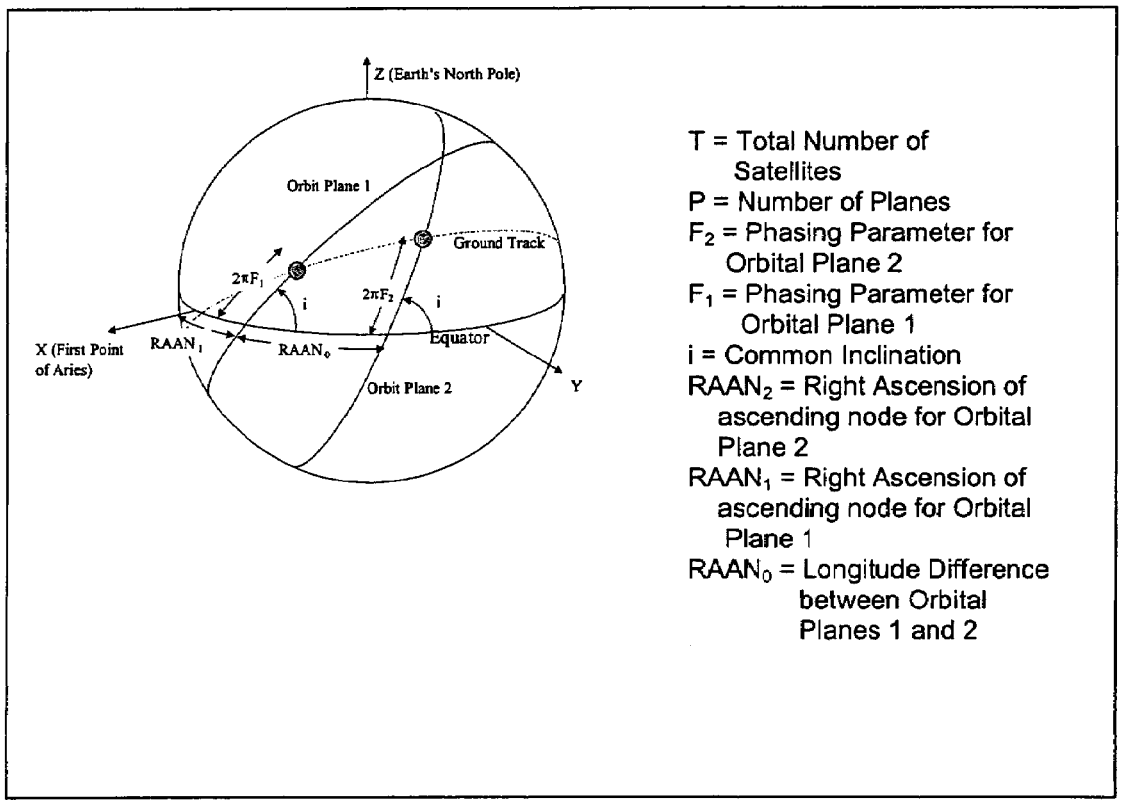
FIG. 4 illustrates orbit definitions for common ground track constellations in accordance with a preferred embodiment of the present invention.

For example, in accordance with a preferred embodiment of the present invention, FIG. 4 illustrates an analytical approach to designing an exemplary change detection orbit. As shown in FIG. 4, an analytical approach for determining the orbital parameters for groups of satellites in common change detection orbits is illustrated. For the purpose of illustration, the analysis presented herein is done for the most part for a spherical earth. However, in practice, the results presented for a spherical earth should be perturbed to account for such effects such as the earth's oblateness, the precession of the orbits of the satellite due to such effects and the precession of the earth due to the gravitational effects of the moon, sun, and other celestial bodies.

Altitudes selected for illustrating the novel approach for satellite constellation design will take the above noted effects of a spherical earth into account and will result in orbits with integer and non-integer numbers of traces in a 24-hour period. In the sections to follow, all of the above noted effects are taken into account to develop a practical preferred embodiment to this invention.

For example, FIG. 4 illustrates preferred definitions for a general change detection orbit. In a spherical model of the earth, if a satellite orbits at a radius a (in km), that satisfies the following equation:

$$k = 1/\omega_e (\mu/a^3)^{0.5} \quad (1)$$

where $$\mu = \text{Kepler's gravitational constant} = 3.986 \times 10^5 \text{ km}^3/\text{s}^2 \quad (2)$$

$$\omega_e = \text{Earth's rotation rate} = 7.292 \times 10^{-5} \text{ rad/s} \quad (3)$$

for integer and non-integers values of k, then the satellite will orbit the earth exactly k times in a 24-hour period. As such, the satellite radius "a" will determine the number of times that the satellite will orbit the earth in a 24-hour period. The satellite radius "a" is a combination of the earth's radius and the altitude of the satellite. Specifically, $a = R_e + h$, wherein $R_e$=the radius of the earth and h=the altitude of the satellite.

For an oblate spheroid model of the Earth, slightly smaller altitudes (radius) are found for any given value of k. During the analysis stage, any desired altitude can be found by trial and error or exactly using the commercially available Satellite Tool Kit (STK) orbital mechanics simulator, for example.

In essence, this inventor has discovered that satellites having common ground tracks/paths are characterized by the following relationships:

$$RAAN_2 = \text{mod}(RAAN_1 + RAAN_0, 2\pi) \quad (4)$$

$$2\pi F_2 = \text{mod}(2\pi F_1 - 2\pi k RAAN_0, 2\pi) \quad (5)$$

As shown in FIG. 4, $RAAN_1$ represents (in radians) the right ascension of ascending node for orbital plane 1; $RAAN_2$ represents (in radians) the right ascension of ascending node for orbital plane 2 (not shown); $RAAN_0$ represents (in radians) the longitude difference between orbital planes 1 and 2; $F_1$ represents the phasing parameter for orbital plane 1; and $F_2$ represents the phasing parameter for orbital plane 2. The right ascension of the ascending node is the angle from the vernal equinox to the ascending node. The ascending node is the point where the satellite passes through the equatorial plane moving from south to north. Right ascension is measured as a right-handed rotation about the pole, Z.

All satellites, that have the same $RAAN_1$, $F_1$, and k that satisfies the above equations (1)-(5), will have a common ground track. In other words, by starting with a predetermined value for $RAAN_1$, $F_1$ and the inclination, the difference between two adjacent satellites (placed in different orbital planes) can be calculated wherein a common ground track is achieved. First, the parameters for satellite 1 are designed, then the parameters for satellite 2 are calculated using modular arithmetic formulas (4) and (5). Formulas (4) and (5) rely on dividing the combination of the RAAN and the differential RAAN by $2\pi$ radians and looking for multiples of $2\pi$ radians, thereby achieving a common ground track.

Formulas (4) and (5) can also by expressed in terms of degrees wherein $2\pi$ radians could be replaced with 360°. If it is desired that all satellites be equally spaced, then one would take 360° and divide by the number of satellites. However, any arbitrary spacing between satellites can be derived.

Furthermore, unequal phasing may be chosen, which will make it difficult to predict the passage of the next satellite and a group of unequally spaced satellites. In either case, satellite 1 and satellite 2 will follow the same track on the ground. Satellite 2 will substantially overlap the ground track made by the orbit of satellite 1.

By lining up the appropriate RAAN, inclination and phasing nearly perfectly, a common ground track can be achieved. Furthermore, by varying the $RAAN_0$, the longitude difference between orbital planes 1 and 2, by any amount desired, satellite 1 and satellite 2 can be real close together or far apart. Exactly where the satellites should be placed can be determined so that their orbits will carve out the same ground track. Thereafter, by precisely synchronizing the images taken from the successive satellites traveling along this common ground track, very high precision (pixel level or sub-pixel level) change detection images can be achieved when pixel-by-pixel differences are taken of the successive images. The precision of the change detection images is characterized by the timing and frequency synchronized aboard the two spacecrafts.

EXAMPLE 1

In addressing the problems noted above, an example involving two satellites orbiting in a common plane (See FIG. 3) will be used. For this example, the ground tracks of the two satellites are different, and images taken from each of the satellites can not be accurately combined to form a change detection image without performing some sort of image processing to remove the distortion and blurring.

Figure 3:
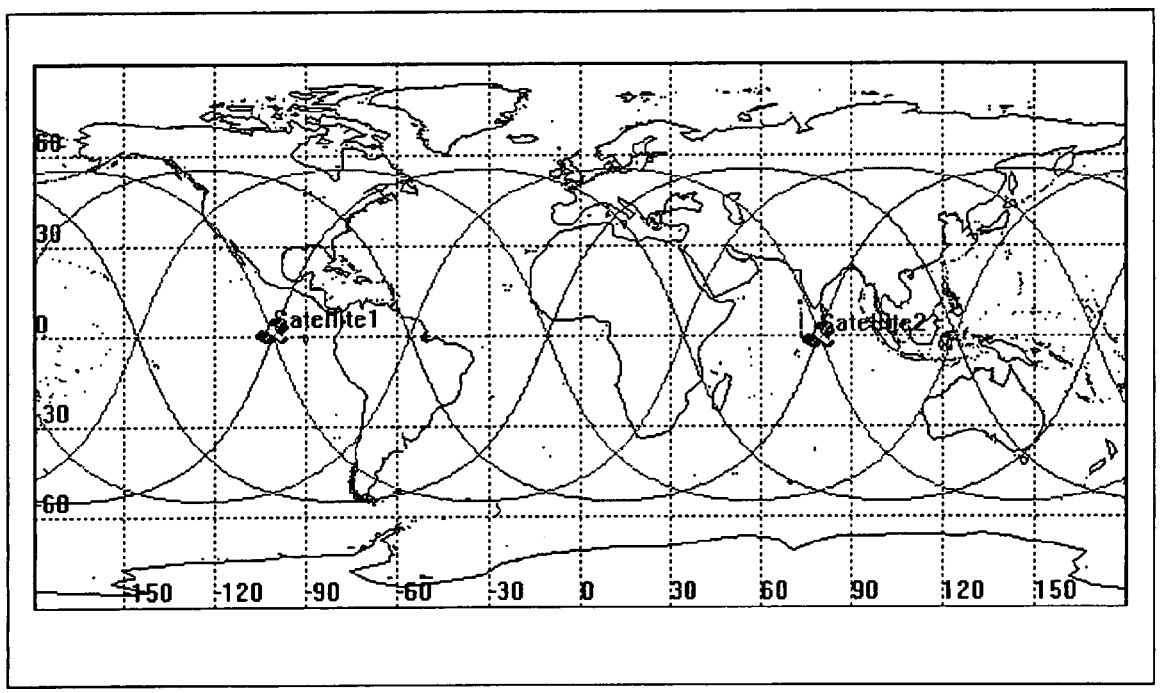
FIG. 3 illustrates ground tracks of a 2/1/0 constellation as defined in FIG. 2.
Figure 5:
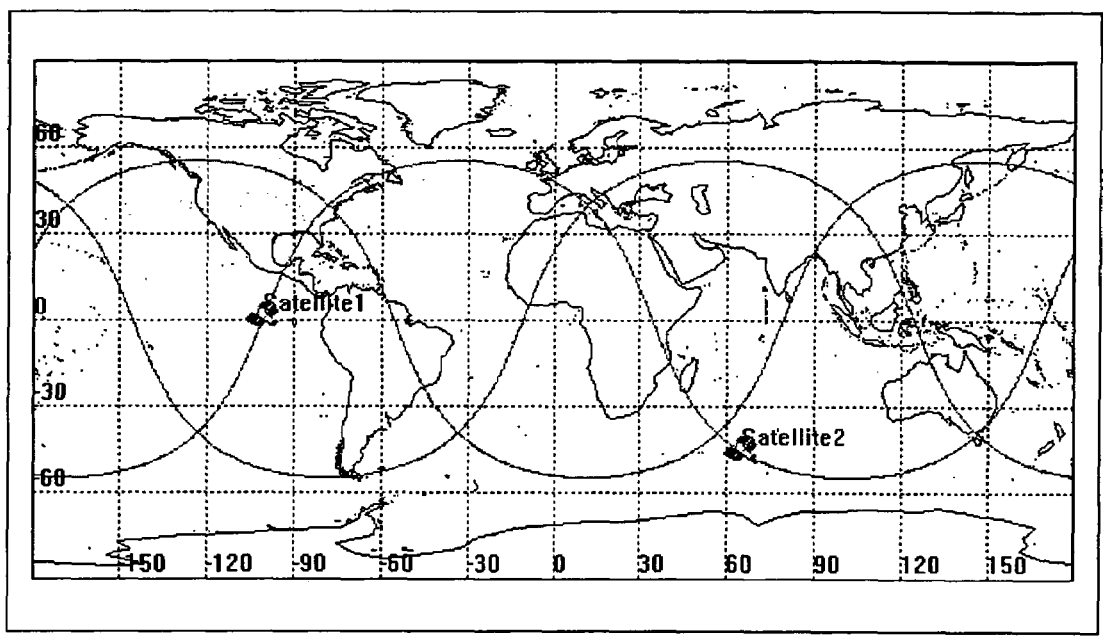
FIG. 5 illustrates two satellites with common ground tracks in accordance with a preferred embodiment of the present invention.

FIG. 5 illustrates an example of a change detection orbit comparable to FIG. 3, yet FIG. 5 is designed according to the approach presented in this disclosure. For instance, as shown in FIG. 5, satellite 1 is the same as FIG. 3. However, satellite 2 is placed in a separate plane from satellite 1. This separate plane for satellite 2 has a right ascension of the ascending node (RAAN) of 300 degrees relative to the first satellite while the phasing angle between the two satellites is set at 240 degrees. The phasing angle defines the difference in angle between the two satellites. The choice of RAAN and phasing is critical to achieving a common ground track. For each successive satellite, the RAAN and phasing is varied and the inclination remains the same.

Notice, in FIG. 5, there are three traces across the surface of the earth, which corresponds to the common ground track for satellites 1 and 2. The orbits shown in FIG. 5 no longer corresponds to a typical Walker type orbit. Specifically, satellites 1 and 2 have common inclinations, e.g., 55 degrees, but the phasing between the satellites and the spacing between planes no longer conforms to the symmetrical Walker type orbits. The inclination of 55 degrees is purely arbitrary. Any value can be chosen for the inclination.

To design a constellation in this manner, the spacing and phasing between satellites in adjacent planes need to be adjusted to form a string of satellites traveling along a common ground track, with coverage regions that overlap between successive satellites throughout its length. Several such common ground tracks (not necessarily co-located) may be constructed and tiled such that there are no gaps in the coverage of the earth between two desired latitudes (a common ground track constellation requirement). A string of satellites may be designed close together so as to look down upon a particular region of the earth for longer periods of time. In this instance, the $RAAN_0$, the difference between RAANs, will be very narrow or small.

The above example 1 results can be extended to define a string or constellation of satellites optimized to provide maximal contiguous coverage with the least number of satellites. For instance, another preferred embodiment illustrates a string of 10 satellites that exemplifies this approach. Also, by design, when one satellite in the string goes out of range of that spot on the earth, the next satellite would pick up the spot. The difference between the two positions are designed for the electronics aboard the satellites to meet the requirements that they would be able to transfer the job from one satellite to the next. However, there is no restriction of being able to pass off the task of looking at a given ground point from one satellite to the next. Furthermore, there is no requirement that the spacing between satellites be uniform.

EXAMPLE 2

In yet another example, a string of satellites that provides contiguous coverage over any point on earth for some predefined period of time is designed. The specification for this string of satellites is determined in the following manner.

Figure 6:
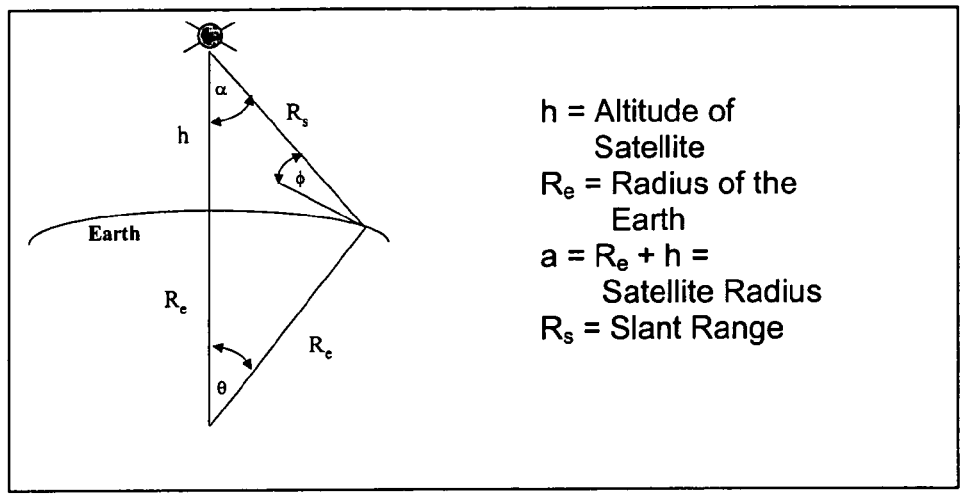
FIG. 6 illustrates the geometry for a string of satellites that provides contiguous coverage over any point on earth for some predefined period of time in accordance with a preferred embodiment of the present invention.

First, the radius of coverage, $r_o$, is determined for an individual satellite. FIG. 6 illustrates the geometry for this situation.

From this geometry, one finds that the coverage radius is given by:

$$r_o = R_e \{\pi/2 - \phi - a \sin[(R_e/a)\cos\phi]\} \quad (6)$$

The coverage radius is formulated in terms of the driving requirements: the minimum graze angle, $\phi$, and the satellite radius, a, with respect to the center of the earth.

Figure 7:
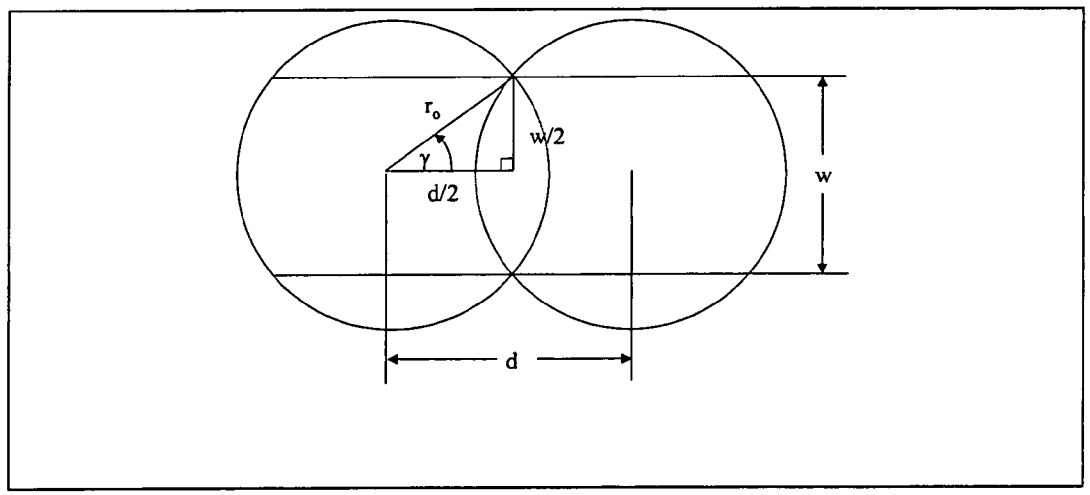
FIG. 7 illustrates Earth coverage using a flat Earth model by a contiguous string of satellites in accordance with a preferred embodiment of the present invention.

Second, the spacing between satellites, d, and the width of the contiguous coverage region, w, is determined by optimizing the width with respect to the total area coverage. Using a flat earth model (see FIG. 7), the optimal angle, $\gamma$, from the center of one satellite's coverage region to the edge of the overlapping coverage region of the adjacent satellite, for m satellites ($m \geq 2$) in a contiguous string of satellites, is found to be given by:

$$\gamma = a\cos\{[(4m-3)/(8m-4)]^{0.5}\} \quad (7)$$

Therefore, the optimal width of contiguous coverage is found to be:

$$w = 2r_o[(4m-3)/(8m-4)]^{0.5} \quad (8)$$

and the spacing between satellites is given by:

$$d = 2r_o[(4m-1)/(8m-4)]^{0.5} \quad (9)$$

Any string of satellites, defined by this prescription, will provide the largest contiguous coverage using the least amount of satellites.

Based on the above methodology, a string of satellites that can be used for change detection can easily be devised. This methodology has been tested using the STK (Satellite Tool Kit) orbital mechanics simulator. Any similar type of simulator may also be used.

Below, Table 1 lists the major orbital characteristics of the ten satellites in this exemplified change detection system of satellites.

TABLE 1

| Satellite Number | Inclination (degrees) | RAAN (degrees) | 360 F. (degrees) | Radius a (km) | Graze (degrees) |
|---|---|---|---|---|---|
| 1 | 55 | 0 | 0 | 8008.14 | 10 |
| 2 | 55 | 356.8 | 38.6 | 8008.14 | 10 |
| 3 | 55 | 353.6 | 77.2 | 8008.14 | 10 |
| 4 | 55 | 350.4 | 115.8 | 8008.14 | 10 |
| 5 | 55 | 347.1 | 154.4 | 8008.14 | 10 |
| 6 | 55 | 343.9 | 193 | 8008.14 | 10 |
| 7 | 55 | 340.7 | 231.5 | 8008.14 | 10 |
| 8 | 55 | 337.5 | 270.1 | 8008.14 | 10 |
| 9 | 55 | 334.3 | 308.7 | 8008.14 | 10 |
| 10 | 55 | 331.1 | 347.3 | 8008.14 | 10 |

Specifically, Table 1 lists the orbital characteristics of ten satellites for a single revolution ground track that could be used to build a constellation. A single revolution of the ground track is chosen as the unit for tiling because it minimizes the number of regions of discontinuity on the earth's surface which is required to get a desired level of coverage. The discontinuity in joining the ends of the ground track is due to the compression in the eastward distance traveled by a satellite due to the earth's rotation.

The present invention does not preclude having multiple regions of discontinuity that will occur when the tiling ground track is made to be less than one revolution. Furthermore, the present invention does not preclude having discontinuous regions of discontinuity such as exhibited when the tiling ground track is greater than one revolution. Furthermore, the present invention does not preclude having no regions of discontinuity. This last case occurs when the tiling ground track closes on itself. However, in this latter case, the closure requirement restricts the altitudes at which these "perfect" constellations (constellations with optimal coverage) can be built.

The set of satellites as illustrated in Table 1 were programmed into the Satellite Tool Kit (STK) orbital mechanics simulator to demonstrate/verify the level of coverage and the ground tracks for this collection of satellites. The STK Simulator, by Analytical Graphics, is basically a validated computer model for detailed evaluation of constellation configurations. It can accurately propagate all satellite orbits, including high ordered perturbation effects due to the earth's oblateness.

Figure 8A:
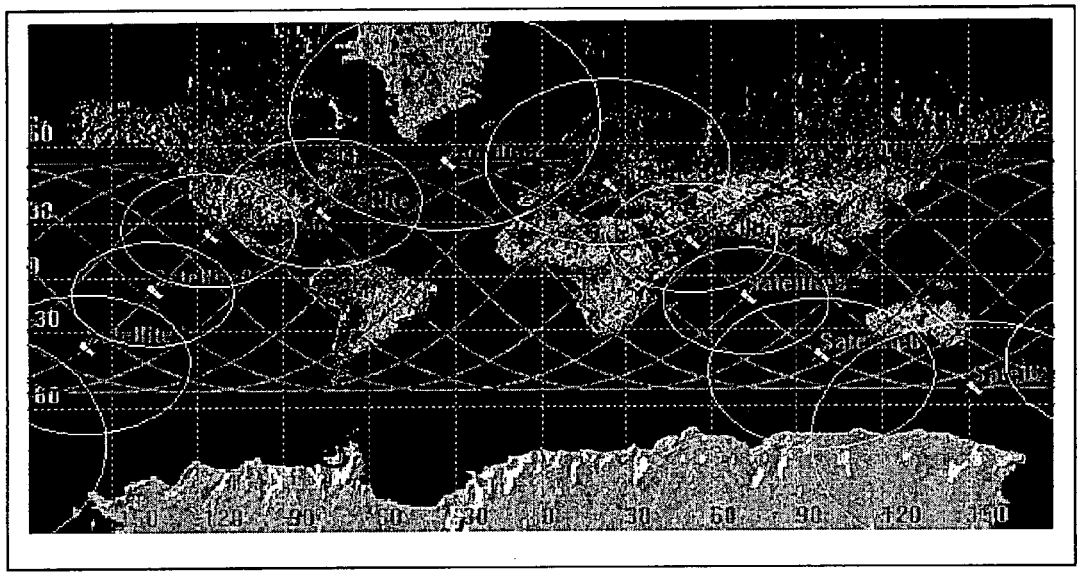
FIG. 8A illustrates coverage and ground tracks of a ten satellite common ground track tile in accordance with a preferred embodiment of the present invention.

FIG. 8A shows a worldwide snapshot of the ground track and the coverage by the ten satellites at a single instant in time. There are exactly eleven traces that form the ground track for this example. Therefore, a constellation of approximately 110 satellites along this ground track will completely cover the earth without any regions of discontinuity. It is projected that this constellation will continually provide six satellites in view everywhere on earth between the latitudes of ±83 degrees.

In addition, the contiguous coverage time for this string of ten satellites turns out to be approximately 2 hours, 7 minutes and 45 seconds. However, for most points on the earth the string of satellites will pass over the point between 2 and 3 times before a gap in the coverage occurs. Thus, the total contiguous coverage time for an image is between 4.25 and 6.4 hours. Two, ostensibly orthogonal, images can be taken of a given area per day. This feature is due to the fact that in these orbits the ground traces cross each other at numerous locations throughout the earth.

Figure 8B:
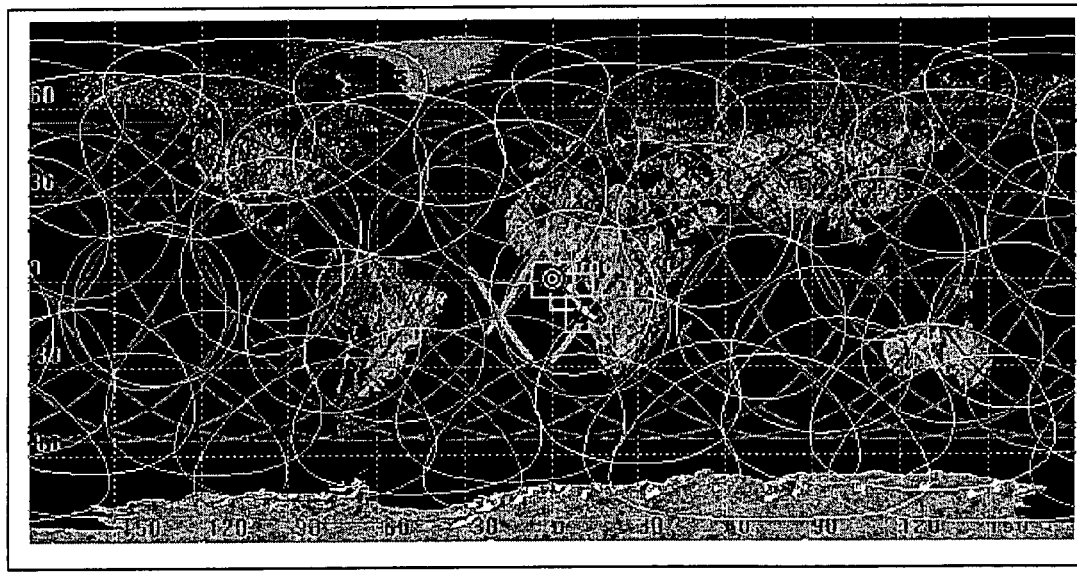
FIG. 8B illustrates coverage and ground tracks of a fifty-satellite common ground track constellation in accordance with a preferred embodiment of the present invention.

Next, as illustrated in FIG. 8B, a constellation of fifty satellites is designed based on tiling five common ground tracks. Tables 1-5 list the orbital characteristics of the satellites in this constellation. (Note the use of the same 10 satellites discussed above.) FIG. 8B shows the coverage and ground tracks of this common ground track constellation. It also shows the target location (the "bulls eye" near the West Coast of Africa on the equator) for verifying the minimum number of satellites in-view that this constellation provides.

TABLE 2

| Satellite Number | Inclination (degrees) | RAAN (degrees) | 360 F. (degrees) | Radius a (km) | Graze (degrees) |
|---|---|---|---|---|---|
| 11 | 55 | 288.0 | 144.0 | 8008.14 | 10 |
| 12 | 55 | 284.8 | 182.6 | 8008.14 | 10 |
| 13 | 55 | 281.6 | 221.2 | 8008.14 | 10 |
| 14 | 55 | 278.4 | 259.8 | 8008.14 | 10 |
| 15 | 55 | 275.1 | 298.4 | 8008.14 | 10 |
| 16 | 55 | 271.9 | 337.0 | 8008.14 | 10 |
| 17 | 55 | 268.7 | 15.5 | 8008.14 | 10 |
| 18 | 55 | 265.5 | 54.1 | 8008.14 | 10 |
| 19 | 55 | 262.3 | 92.7 | 8008.14 | 10 |
| 20 | 55 | 259.1 | 131.3 | 8008.14 | 10 |

TABLE 3

| Satellite Number | Inclination (degrees) | RAAN (degrees) | 360 F. (degrees) | Radius a (km) | Graze (degrees) |
|---|---|---|---|---|---|
| 21 | 55 | 216.0 | 288.0 | 8008.14 | 10 |
| 22 | 55 | 212.8 | 326.6 | 8008.14 | 10 |
| 23 | 55 | 209.6 | 5.2 | 8008.14 | 10 |
| 24 | 55 | 206.4 | 43.8 | 8008.14 | 10 |
| 25 | 55 | 203.1 | 82.4 | 8008.14 | 10 |
| 26 | 55 | 199.9 | 121.0 | 8008.14 | 10 |
| 27 | 55 | 196.7 | 159.5 | 8008.14 | 10 |
| 28 | 55 | 193.5 | 198.1 | 8008.14 | 10 |
| 29 | 55 | 190.3 | 236.7 | 8008.14 | 10 |
| 30 | 55 | 187.1 | 275.3 | 8008.14 | 10 |

TABLE 4

| Satellite Number | Inclination (degrees) | RAAN (degrees) | 360 F. (degrees) | Radius a (km) | Graze (degrees) |
|---|---|---|---|---|---|
| 31 | 55 | 144.0 | 72.0 | 8008.14 | 10 |
| 32 | 55 | 140.8 | 110.6 | 8008.14 | 10 |
| 33 | 55 | 137.6 | 149.2 | 8008.14 | 10 |
| 34 | 55 | 134.4 | 187.8 | 8008.14 | 10 |
| 35 | 55 | 131.1 | 226.4 | 8008.14 | 10 |
| 36 | 55 | 127.9 | 265.0 | 8008.14 | 10 |
| 37 | 55 | 124.7 | 303.5 | 8008.14 | 10 |
| 38 | 55 | 121.5 | 342.1 | 8008.14 | 10 |
| 39 | 55 | 118.3 | 20.7 | 8008.14 | 10 |
| 40 | 55 | 115.1 | 59.3 | 8008.14 | 10 |

TABLE 5

| Satellite Number | Inclination (degrees) | RAAN (degrees) | 360 F. (degrees) | Radius a (km) | Graze (degrees) |
|---|---|---|---|---|---|
| 41 | 55 | 72.0 | 216.0 | 8008.14 | 10 |
| 42 | 55 | 68.8 | 254.6 | 8008.14 | 10 |
| 43 | 55 | 65.6 | 293.2 | 8008.14 | 10 |
| 44 | 55 | 62.4 | 331.8 | 8008.14 | 10 |
| 45 | 55 | 59.1 | 10.4 | 8008.14 | 10 |
| 46 | 55 | 55.9 | 49.0 | 8008.14 | 10 |
| 47 | 55 | 52.7 | 87.5 | 8008.14 | 10 |
| 48 | 55 | 49.5 | 126.1 | 8008.14 | 10 |
| 49 | 55 | 46.3 | 164.7 | 8008.14 | 10 |
| 50 | 55 | 43.1 | 203.3 | 8008.14 | 10 |

Table 1 illustrates satellites in a first ground track tile, Table 2 illustrates satellites in a second ground track tile, Table 3 illustrates satellites in a third ground track tile, Table 4 illustrates satellites in a fourth ground track tile, and Table 5 illustrates satellites in a fifth ground track tile. A tile is related to the visualization of the region unique to each satellite.

Figure 9:
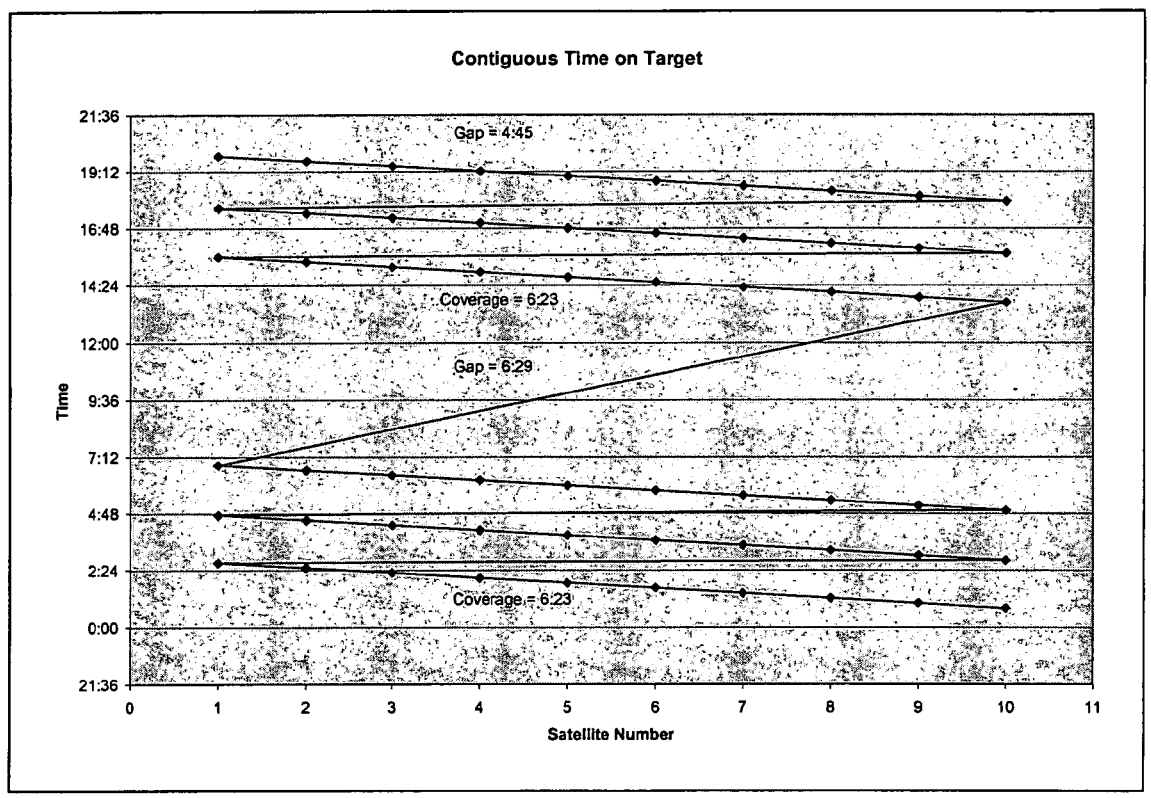
FIG. 9 illustrates the continuous coverage over a point on the Earth during any 24-hour period in accordance with a preferred embodiment of the present invention.

FIG. 9 shows the continuous coverage over a point on the earth during any 24-hour period with regards to the access time by the ten satellite change detection system of orbits. As shown in FIG. 9, the ten satellite constellation design can view the target for up to 6.23 hours before a gap in coverage occurs, for example.

Figure 10:
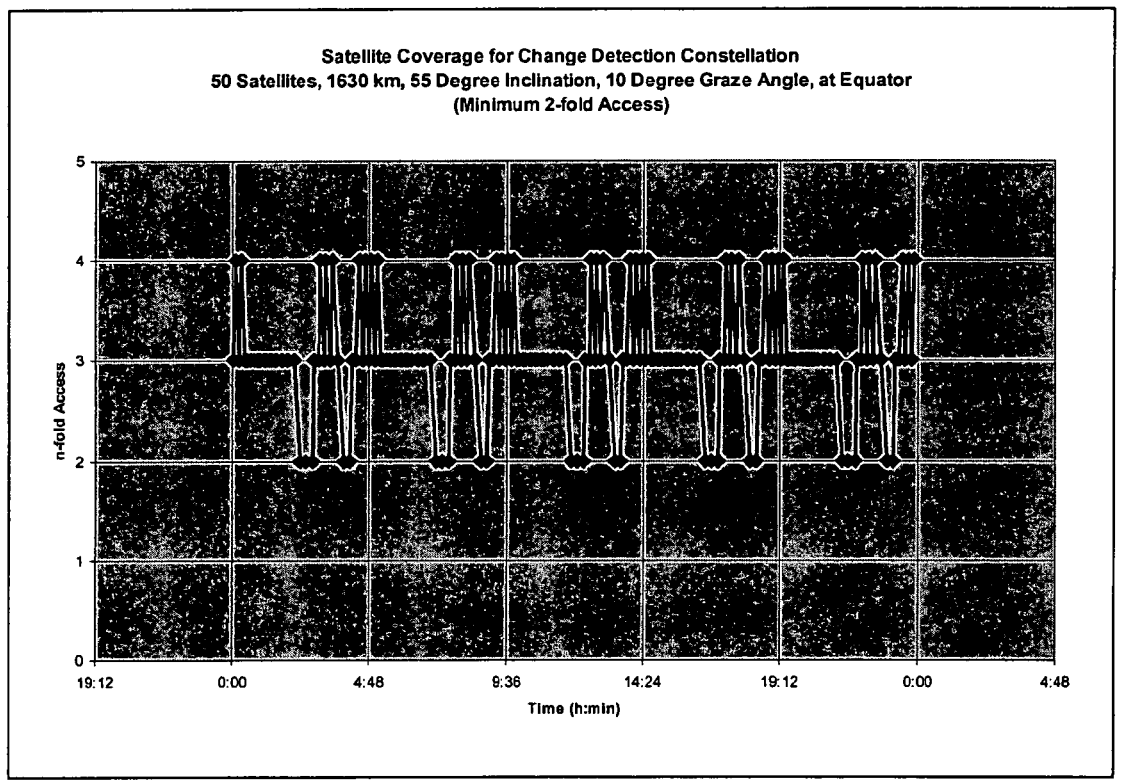
FIG. 10 illustrates the coverage at a point on the equator near the West Coast of Africa and verifies the contiguous 2-fold coverage in accordance with a preferred embodiment of the present invention.

Similarly, FIG. 10 illustrates the coverage at a point on the equator near the West Coast of Africa (see Target 1 on FIG. 8B) for a fifty satellite constellation. As shown, FIG. 10 verifies the contiguous 2-fold coverage provided by this constellation. The coverage as a function of time for this constellation is designed to be a minimum of 2-fold. The term 2-fold relates to being able to see from the ground at least two satellites at all times.

All common ground track tiles in a constellation have common factors of k and $RAAN_0$. Common ground track constellations (common k) can be designed with tiles of differing $RAAN_0$ values when there is a requirement to change the number of satellites in-view over various periods of time.

Common ground tracks of one revolution are joined together at an interface. In other words, the common ground tracks are tiled (overlapped) to provide the desired coverage of the earth. One characteristic of this type of tiling is the presence of a region of dislocations in which greater coverage exists than elsewhere on earth. With the appropriate spacing between satellites, this tiling approach can lead to gapless coverage (between two desired latitudes).

Figure 11:
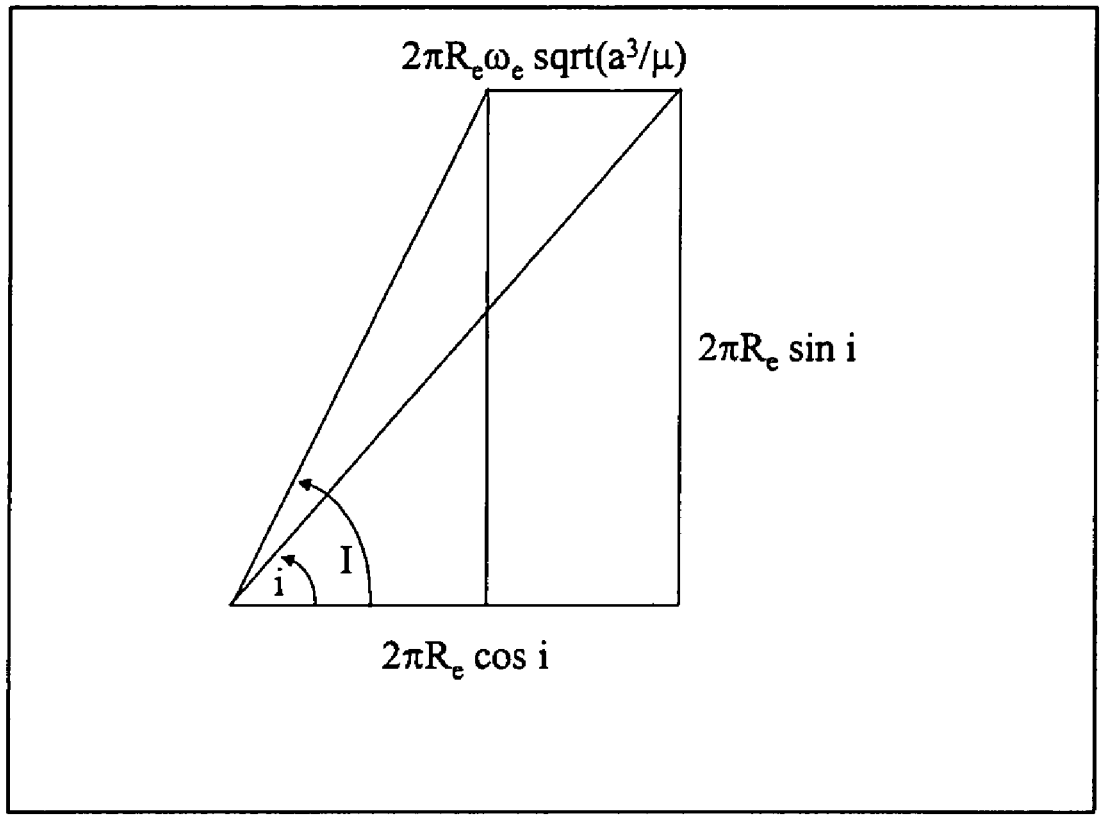
FIG. 11 illustrates a model used for determining the length of one revolution of a common ground track tile in accordance with a preferred embodiment of the present invention.

Illustrated in FIG. 11 is an exemplary model used for estimating the length of a common ground track over one revolution. Shown is the path of a single orbit of a satellite at inclination, i. The time, T, it takes to make one revolution is given by $$T = 2\pi \text{sqrt}(a^3/\mu) \quad (10)$$

During that time, the earth rotates through an angle, $\theta_e$ in radians, that is given by $$\theta_e = \omega_e T = 2\pi \omega_e \text{sqrt}(a^3/\mu) \quad (11)$$

which decreases the eastward motion of the satellite relative to the earth's surface. A constant pitch ground track exemplifies the ground track of a single orbit of the satellite. The length, L, of the path for this ground track is approximately given by $$L = 2\pi R_e \text{sqrt}[1 + \omega_e^2 a^3/\mu - 2\omega_e \text{sqrt}(a^3/\mu) \cos i] \quad (12)$$

and the pitch, I in radians, of the ground track is approximately given by $$I = a \tan \{\sin i / [\cos i - \omega_e \text{sqrt}(a^3/\mu)]\} \quad (13)$$

When $\omega_e = 0$, one finds that I=i, and the common ground tracks of constant pitch degenerate into planes of constant inclination.

For example, for a hexagonal packed array, $I = \pi/3$, of satellite access regions oriented with one of its three axes along the common ground track and another axis along the equator, the inclination, $i = i_1$ in radians, of the individual satellites is found to be given by $$i_1 = a \cos \{0.75\omega_e \text{sqrt}(a^3/\mu) + 0.5\text{sqrt}[1 - 0.75\omega_e^2 a^3/\mu)]\} \quad (14)$$

Figure 12:
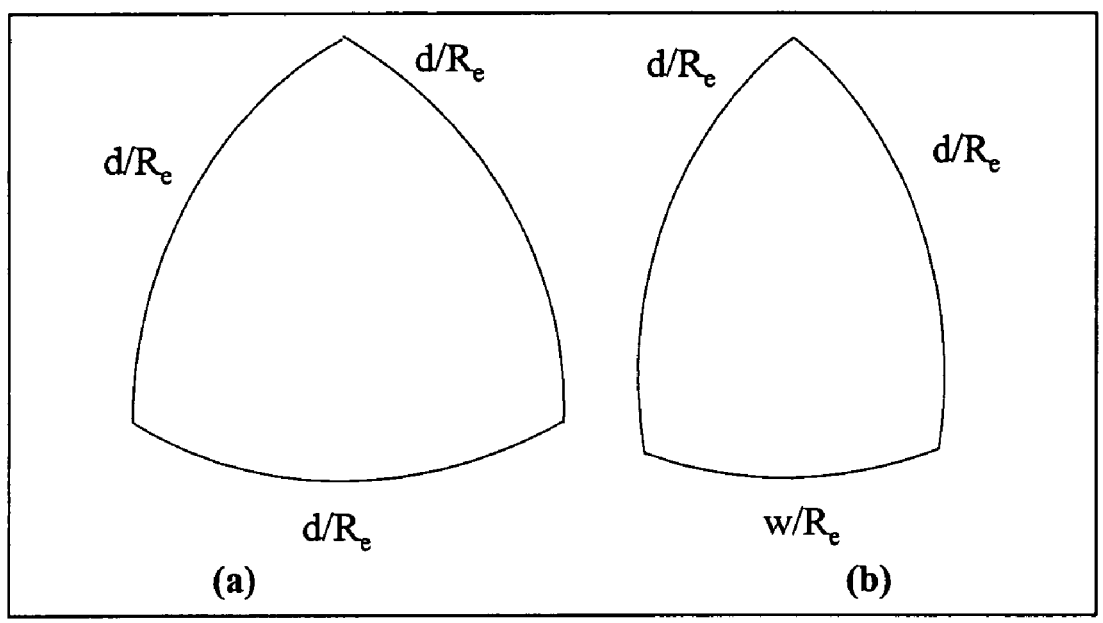
FIG. 12 illustrates equilateral and isosceles triads in accordance with a preferred embodiment of the present invention.
Figure 15:
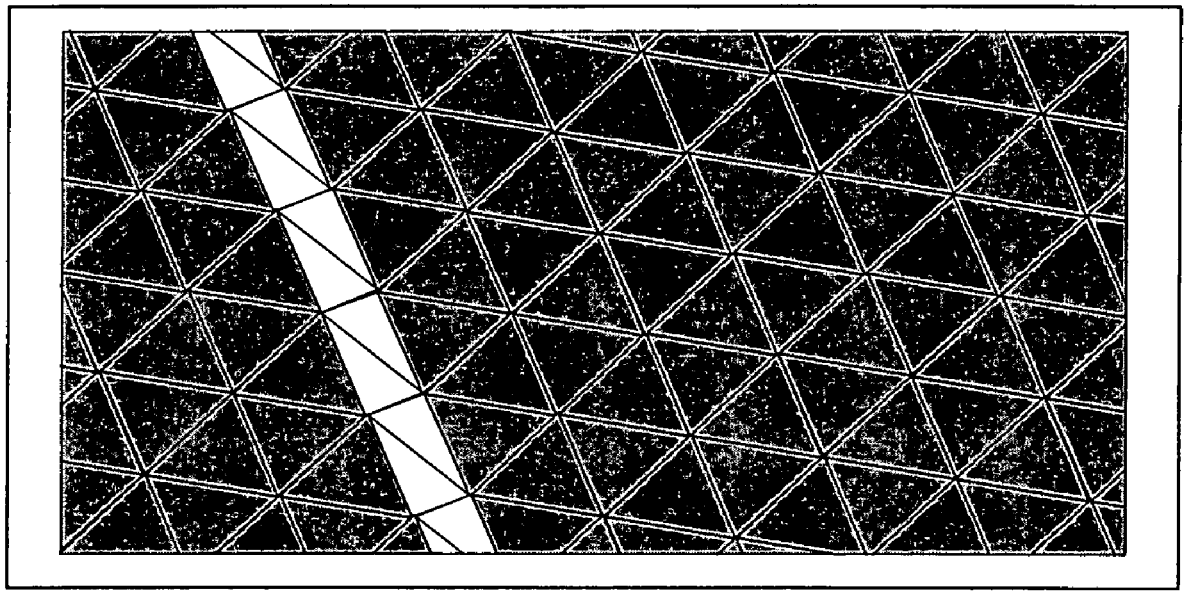
FIG. 15 illustrates a hexagonal tiling of the Earth's surface along common ground tracks in accordance with a preferred embodiment of the present invention.

FIG. 15 illustrates a hexagonal tiling of the earth's surface along common ground tracks. Further, as shown in FIG. 12, the unit of tiling in a hexagonal packed array of satellites is preferably the equilateral triad. For example, two satellites of the three satellites are from one ground track and the third satellite comes from an adjacent ground track. Diagram (a) in FIG. 12 illustrates the equilateral triad and diagram (b) illustrates the isosceles triad.

Normally the equilateral triad will completely tile a plane without any dislocations. However, in tiling the earth, the spinning of the earth causes the tiles to meet along a line of dislocation. The spinning of the earth is somewhat equivalent to twisting a surface that needs to be tiled. The line of dislocation is parallel to the third axis of the triad (at an angle equal to $I - 2\pi/3$ radians, see FIG. 14).

Assuming the phasing to the first satellite in an equilateral triad is zero, $2\pi F_0 = 0$, the phasing, $2\pi F_1$ in radians, to the second satellite in an equilateral triad is given by $$2\pi F_1 = a \sin [\sin(d/R_e)\sin(\pi/3 + i - i_1)/\sin i] \quad (15)$$

and the phasing, $2\pi F_2$ in radians, to the third satellite in an equilateral triad, and hence to the adjacent ground track, is given by $$2\pi F_2 = a \sin [\sin(d/R_e)\sin(i_1 - i)/\sin i] \quad (16)$$

Assuming the right ascension of the ascending node (RAAN) to the first satellite in an equilateral triad is zero, $RAAN_0 = 0$, the right ascension of the ascending node, $RAAN_1$ in radians, to the second satellite in an equilateral triad is given by $$RAAN_1 = a \tan [\tan(d/R_e)\cos(\pi/3 + i - i_1)] - a \tan [\tan 2\pi F_1 \cos i] \quad (17)$$

and the right ascension of the ascending node, $RAAN_2$ in radians, to the third satellite in the equilateral triad, and hence the adjacent ground track, is given by $$RAAN_2 = a \tan [\tan(d/R_e)\cos(i_1 - i)] - a \tan [\tan 2\pi F_2 \cos i] \quad (18)$$

Figure 13:
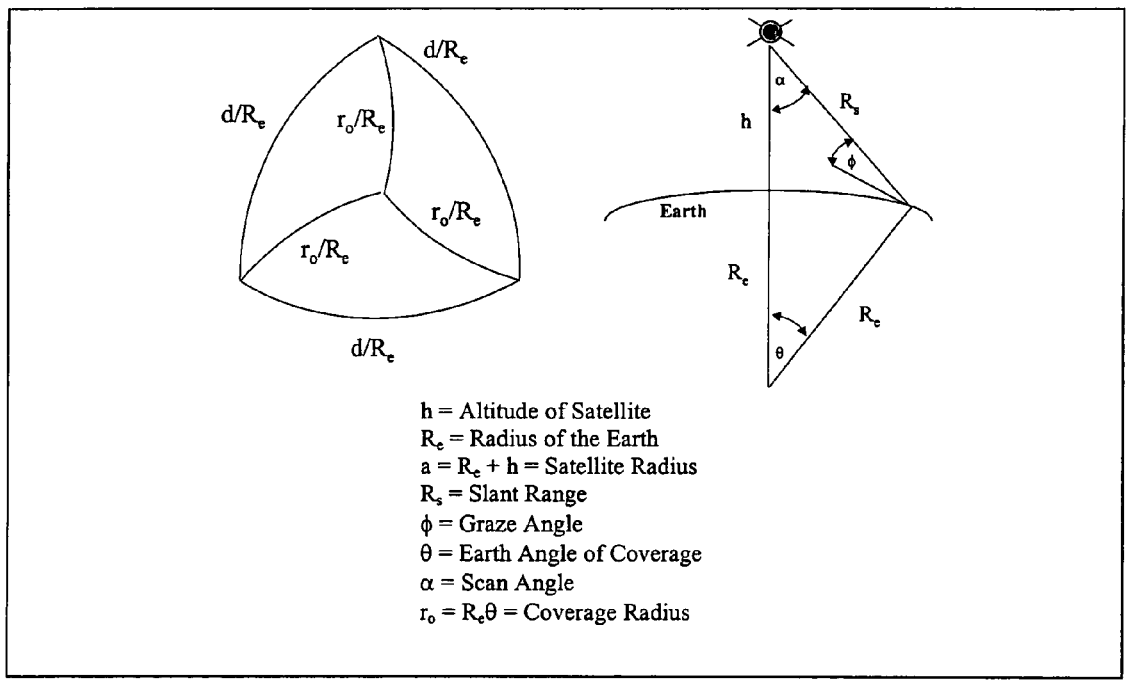
FIG. 13 illustrates the coverage radius and spherical triad spacing in accordance with a preferred embodiment of the present invention.

The spacing between satellites along the ground track, d, and within the equilateral triad (see FIG. 13) is given by $$d = 2R_e a \sin \{0.5\text{sqrt}(3)\sin [\pi/2 - \phi - a \sin([R_e/a] \cos \phi)]\} \quad (19)$$

The above relationships for $2\pi F_o$, $RAAN_o$, $2\pi F_1$, $RAAN_1$, $2\pi F_2$, $RAAN_2$, and d establish the spatial arrangement for the tiles.

The number of satellites, S, along one complete ground track is given by $$S = \text{ceiling}[(L/d), 1] \quad (20)$$

where the ceiling function rounds up to the nearest integer, and the number of interleaved common ground tracks, P, required to cover the Earth is given by $$P = \text{ceiling}[2\pi / RAAN_2, 1] \quad (21)$$

Figure 14:
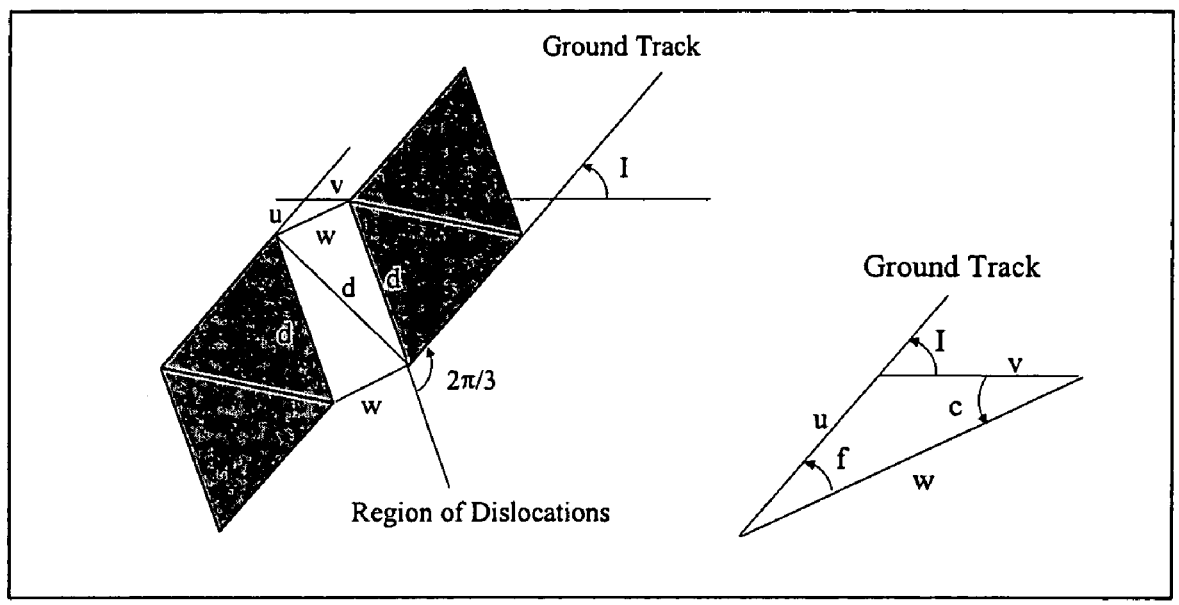
FIG. 14 illustrates the geometry of a ground track at region of dislocations in accordance with a preferred embodiment of the present invention.

The above solution is merely approximate. An even better solution involves analysis of the region of dislocations (see FIG. 14). FIG. 14 illustrates the geometry of ground tracks at region of dislocations. One way to form the region of dislocation is to assume that the interface region is formed from pairs of isosceles triads (see FIG. 12) that glue together the equilateral triads used to tile the surface. Tiling of these common ground tracks, shown in FIG. 14, for the desired earth coverage involves the simultaneous solution of the following six equations:

$$1. c = 2\pi/3 - b + i - i_1 \quad (22)$$

$$2. f = 2\pi/3 - b - a \sin [\sin(w/R_e)\sin a/\sin(d/R_e)] \quad (23)$$

$$3. w = R_e a \cos \{\cos^2(d/R_e) + \sin^2(d/R_e)\text{sqrt} [1 - \{\sin(w/R_e)\sin b/\sin(d/R_e)\}^2]\} \quad (24)$$

$$4. v = R_e a \sin [\sin(w/R_e)\sin f/\sin(\pi/3 + i - i_1)] = 2\pi \omega_e R_e \text{sqrt}(a^3/\mu) \quad (25)$$

$$5. u = R_e a \sin [\sin w/R_e \sin c/\sin(\pi/3 + i - i_1)] \quad (26)$$

$$6. d = R_e a \cos \{\cos(v/R_e + RAAN)\cos(d/R_e + F - u/R_e) + \sin(v/R_e + RAAN)\sin(d/R_e + F - u/R_e)\cos(\pi/3 + i - i_1)\} \quad (27)$$

Using the above relations the revised values for the number of satellites per ground track can be found from $$S = \text{ceiling}\{[(L - u)/d], 1\} \quad (28)$$

and the number of interleaved common ground tracks, P, required to cover the Earth is given by $$P = \text{ceiling}[(2\pi - v/R_e)/RAAN_2, 1] \quad (29)$$

Ground tracks, shorter or longer than the above-prescribed common ground tracks, can be used to tile the Earth. Constellations made from one or more common ground tracks of any length that tile the earth are well within the scope of the disclosed invention. Furthermore, coverage with and without the regions of dislocation are feasible and within the scope of the proposed invention.

The above detailed description merely illustrates the principles of common ground track constellations and the applicability to space based SAR change detection. Other embodiments, such as for optical, UV, infrared or other imaging systems, are also feasible based on the principles of this invention and are considered to be within the spirit and scope of this disclosure.

This invention at least enables high precision (pixel level or better) change detection and differential SAR imagery. This type of imagery is very useful in detecting very slow moving objects and locating potential underground construction sites, a key reconnaissance activity for today's intelligence agencies.

Although preferred embodiments of the present invention have been described in detail herein, it should be understood that many variations and/or modifications of the inventive concepts herein taught still fall within the spirit and scope of the present invention.

What is claimed is:

1. A constellation of satellites having a common ground track for providing change detection, comprising:
    at least a first and a second satellite configured in at least two adjacent orbital planes; said first satellite given a predetermined right ascension of ascending node ($RAAN_1$), phasing ($F_1$) and inclination (i), a $RAAN_2$ and a phasing $F_2$ for the at least second satellite being determined in radians by satisfying the expressions $RAAN_2 = mod(RAAN_1 + RAAN_0, 2\pi)$ and $2\pi F_2 = mod(2\pi F_1 - 2\pi k\, RAAN_0, 2\pi)$, respectively, said k representing the number of times the satellites will orbit the earth in a specified period and said $RAAN_0$ representing the longitude difference between the at least two different orbital planes,
    wherein a common ground track for said at least first and second satellites is obtained.

2. The constellation of satellites as set forth in claim 1, wherein k is capable of being either an integer or a non-integer.

3. The constellation of satellites as set forth in claim 1, wherein the at least two adjacent orbital planes share a common inclination.

4. The constellation of satellites as set forth in claim 3, wherein the inclination can be any arbitrary number.

5. The constellation of satellites as set forth in claim 1, wherein the at least first and second satellites are capable of being asymmetrically spaced about the earth by adjusting the phasing unequally and corresponding RAAN.

6. The constellation of satellites as set forth in claim 1, wherein the at least first and second satellites can reach a target point on or above the earth within minutes of each other or within hours of each other by varying the $RAAN_0$ appropriately.

7. The constellation of satellites as set forth in claim 1, wherein the constellation comprises n satellites, where n is $\geq$ two, a $RAAN_n$ and a $phasing_n$ for successive satellites following the at least first satellite is adjusted by multiples of $2\pi$ radians so as to have a ground track that is substantially overlapping the (n−1)th satellite's ground track.

8. The constellation of satellites as set forth in claim 1, wherein said $RAAN_0$ may be finely adjusted so as to have extended coverage over a particular region on the earth.

9. The constellation of satellites as set forth in claim 1, further comprising change detection means for obtaining detection images for at least a particular region on the earth.

10. The constellation of satellites as set forth in claim 9, wherein the at least first and second satellites are capable of transferring the task of imaging a given ground region from one satellite to the next.

11. The constellation of satellites as set forth in claim 1, wherein a two-fold access or greater can be achieved.

12. A method for designing constellations, comprising:
    providing a constellation of satellites having common ground tracks, by
    choosing a right ascension of ascending node ($RAAN_1$), phasing ($F_1$), and inclination for a first satellite;
    for each successive satellite after the first satellite, keeping the same inclination and varying the RAAN and the phasing by multiples of $2\pi$ radians;
    wherein the spacing and phasing between satellites in adjacent planes are adjusted to form a string of satellites traveling along a common ground track with coverage regions that overlap between successive satellites throughout its length.

13. The method as set forth in claim 12, wherein providing the constellation includes launching the satellites from one or several launch vehicles.

14. The method as set forth in claim 12, wherein providing the constellation includes station keeping to account for any drifting of the satellites.

15. The method as set forth in claim 12, wherein providing the constellation includes configuring the satellites into distinct orbital planes each having the same inclination as the first satellite.

16. The method as set forth in claim 12, wherein providing the constellation includes arranging the satellites asymmetrically by adjusting the phasing in unequal increments for subsequent satellites.

17. The method as set forth in claim 12, wherein providing the constellation includes setting any arbitrary number for the inclination between 0 and $\pi/2$ radians (0 and 90 degrees).

18. The method as set forth in claim 12, further comprising gathering change detection images from subsequent satellites in the constellation.

19. The method as set forth in claim 12, wherein providing the constellation includes achieving a two-fold or greater access.

20. A method for designing constellations, comprising:
    providing at least first and second satellites having common ground tracks, by
    configuring said at least first and second satellites in at least two non-coincident orbital planes;
    specifying a predetermined right ascension of ascending node ($RAAN_1$), phasing ($F_1$) and inclination (i) for said first satellite;
    calculating a $RAAN_2$ and a phasing $F_2$ for the at least second satellite by satisfying the expressions $RAAN_2 = mod(RAAN_1 + RAAN_0, 2\pi)$ and $2\pi F_2 = mod(2\pi F_1 - 2k\, RAAN_0, 2\pi)$, respectively, said k representing the number of times the satellites will orbit the earth in a specified period and said $RAAN_0$ representing the longitude difference in radians between the at least two different orbital planes.

21. The method as set forth in claim 20, further comprising gathering change detection images from subsequent satellites in the constellation.

* * * * *